(12) United States Patent
Thorogood et al.

(10) Patent No.: US 12,262,845 B2
(45) Date of Patent: Apr. 1, 2025

(54) COOKING APPLIANCE

(71) Applicant: Breville Pty Limited, Alexandria (AU)

(72) Inventors: Michael Thorogood, Alexandria (AU); Emma Larkin, Alexandria (AU); Marian Silviu Rosian, Alexandria (AU); Brendan Foxlee, Alexandria (AU); Vyvyan Rose, Alexandria (AU)

(73) Assignee: Breville Pty Limited, Alexandria (AU)

( * ) Notice: Subject to any disclaimer, the term of this patent is extended or adjusted under 35 U.S.C. 154(b) by 838 days.

(21) Appl. No.: 17/287,550

(22) PCT Filed: Oct. 22, 2019

(86) PCT No.: PCT/AU2019/051150
§ 371 (c)(1),
(2) Date: Apr. 22, 2021

(87) PCT Pub. No.: WO2020/082117
PCT Pub. Date: Apr. 30, 2020

(65) Prior Publication Data
US 2021/0369051 A1  Dec. 2, 2021

(30) Foreign Application Priority Data

Oct. 23, 2018  (AU) ................. 2018904023

(51) Int. Cl.
*A47J 37/06*  (2006.01)
*A47J 27/00*  (2006.01)
(Continued)

(52) U.S. Cl.
CPC ......... *A47J 37/0658* (2013.01); *A47J 27/004* (2013.01); *A47J 36/36* (2013.01);
(Continued)

(58) Field of Classification Search
CPC .. A47J 37/0658; A47J 37/0635; A47J 27/004; A47J 36/36; A47J 37/00; F24C 7/085
See application file for complete search history.

(56) References Cited

U.S. PATENT DOCUMENTS

| 3,693,538 A | 9/1972 | Synder |
| 4,464,406 A | 8/1984 | Pierick |

(Continued)

FOREIGN PATENT DOCUMENTS

| CN | 203074358 U | 7/2013 |
| CN | 104337409 A | 2/2015 |

(Continued)

OTHER PUBLICATIONS

Machine Translation of Lui et al, CN 203074358, performed on Jan. 23, 2024 (Year: 2013).*

(Continued)

*Primary Examiner* — Brian W Jennison
(74) *Attorney, Agent, or Firm* — KDW Firm PLLC

(57) ABSTRACT

A cooking appliance (200) including: a body (104) providing a floor (105) and a ceiling (110), with the floor (105) and ceiling (110) at least partly surrounding a cooking cavity (116), the body (104) having an opening via which product to be cooked can be moved in and out of the cooking appliance (200), the cavity (116) having a periphery at least partly surrounding a cooking area (117) adjacent the floor (105) to locate the product therein; a heating element (219) located in an upper portion of the cavity (116) to deliver radiant energy to cook the product; and a shield (232) integral to the heating element (219) and at least partly surrounding the heating element (219) to shield a portion of the cooking area (117) from the radiant energy.

3 Claims, 9 Drawing Sheets

(51) Int. Cl.
  *A47J 36/36* (2006.01)
  *F24C 7/08* (2006.01)
  *F24C 15/22* (2006.01)

(52) U.S. Cl.
  CPC ........... *A47J 37/0635* (2013.01); *F24C 7/085* (2013.01); *F24C 15/22* (2013.01)

(56) References Cited

U.S. PATENT DOCUMENTS

| | | | | |
|---|---|---|---|---|
| 5,613,426 A | * | 3/1997 | Chan Gabbai | A47J 37/0611 99/383 |
| 5,809,871 A | * | 9/1998 | Arathoon | A47J 37/0611 99/380 |
| 6,069,345 A | | 5/2000 | Westerberg | |
| 6,150,635 A | | 11/2000 | Hannon | |
| 2006/0051078 A1 | * | 3/2006 | Bonnin | H05B 3/0038 392/423 |
| 2016/0220057 A1 | | 8/2016 | Smith et al. | |
| 2018/0100656 A1 | | 4/2018 | Deshpande | |

FOREIGN PATENT DOCUMENTS

| | | |
|---|---|---|
| GB | 2276809 A | 10/1994 |
| JP | S57183813 A | 11/1982 |
| JP | H11137447 A | 5/1999 |
| RU | 2067412 C1 | 10/1996 |
| WO | WO-9702777 A1 | 1/1997 |

OTHER PUBLICATIONS

International Search Report, International application No. PCT/AU2019/051150, dated Jan. 20, 2020.
European Search Report and Written Opinion for the Application No. 19876666.9, mailed Jul. 19, 2022, 7 pages.

* cited by examiner

COOKING APPLIANCE

FIELD

The present invention relates to cooking appliances, and more particularly, but not exclusively to appliances for cooking pizza.

BACKGROUND

Appliances used to cook pizza, such as an oven, provide for circulation of heat around a cavity within which the pizza is being cooked. The oven includes a heating element positioned within the cavity to radiate heat around the cavity to cook the pizza. Typically, the outer circumference of the pizza (referred to as the crust of the pizza) benefits from a more intense heat than the centre of the pizza where most of the delicate ingredients are arranged. Consequently, more power is supplied to the heating element to increase the radiated heat supplied to the crust. Disadvantageously, whilst the pizza crust is exposed to an intense heat, so too is the delicate centre of the pizza. Moreover, opening the door to the oven undesirably allows heat to escape from the cavity thereby reducing the temperature of the cavity and may cause uneven cooking of the pizza.

OBJECT

It is an object of the present invention to substantially overcome, or at least ameliorate, one or more of the above disadvantages.

SUMMARY OF INVENTION

There is disclosed herein a cooking appliance including:
a body providing a generally horizontally extending floor including a generally circular floor portion, and a ceiling, with the floor and ceiling at least partly surrounding a cooking cavity, the body having an opening via which product to be cooked can be moved in and out of the cooking appliance, the floor portion having a central axis extending perpendicularly between the floor and the ceiling in the cavity, with the floor portion extending radially outwardly from the axis to a periphery of the floor portion having a radius measured from the axis, the cavity having a periphery at least partly surrounding a cooking area adjacent the floor portion to locate the product therein;
an annular region spaced from the axis and located between the periphery of the floor portion and the periphery of the cavity, the annular region having a width extending radially outwardly relative to the axis between the periphery of the floor portion and the periphery of the cavity; and
a heating element extending generally circumferentially around the cooking area and locating within the width of the annular region to deliver radiant energy to cook the product.

There is also disclosed herein a cooking appliance including:
a pizza to be cooked during a cooking cycle of the cooking appliance, the pizza having an inner portion and an outer portion surrounding the inner portion, the outer portion being configured to rise during the cooking cycle;
a body providing a generally horizontally extending floor including a generally circular floor portion, and a ceiling, with the floor and ceiling at least partly surrounding a cooking cavity, the body having an opening via which the pizza to be cooked can be moved in and out of the cooking appliance, the floor portion having a central axis extending perpendicularly between the floor and the ceiling in the cavity, with the floor portion extending radially outwardly from the axis to a periphery of the floor portion having a radius measured from the axis, the cavity having a periphery at least partly surrounding a cooking area adjacent the floor portion, the pizza locating in the cooking area; and
a heating element extending generally circumferentially around the cooking area and outside the outer portion of the pizza to deliver radiant energy to cook the pizza, so that, during an initial stage in the cooking cycle, the radiant energy is absorbed by both the inner portion of the pizza and the outer portion of the pizza, and so that, during a later stage in the cooking cycle, the outer portion of the pizza rises to shield the inner portion of the pizza from the radiant energy.

Preferably, the body includes:
a base providing the floor; and
a cover providing the ceiling, the cover moveable relative to the base between an open position and a closed position, wherein, in the closed position, the floor and the ceiling at least partly surround the cooking cavity, and wherein, in the open position, the pizza can be moved in and out of the cooking appliance.

Preferably, the heating element is coupled to the cover and extends generally circumferentially around the ceiling.

Preferably, the cover is hingedly connected to the base for angular movement about a generally horizontal axis between the open position and the closed position.

Preferably, the cooking appliance includes a lower heating element located adjacent the floor to deliver radiant energy to cook the pizza.

There is also disclosed herein a cooking appliance including:
a body providing a floor and a ceiling, with the floor and ceiling at least partly surrounding a cooking cavity, the body having an opening via which product to be cooked can be moved in and out of the cooking appliance, the cavity having a periphery at least partly surrounding a cooking area adjacent the floor to locate the product therein;
a heating element located in an upper portion of the cavity to deliver radiant energy to cook the product; and
a shield integral to the heating element and at least partly surrounding the heating element to shield a portion of the cooking area from the radiant energy.

Preferably, the heating element includes a tubular sheath having a central longitudinal axis, with the shield at least partly surrounding the tubular sheath.

Preferably, in a cross-sectional plane extending perpendicular to the axis through the sheath and the shield, the shield forms an arc having a radius that matches a radius of an outer surface of the sheath.

Preferably, endpoints of the arc locate on a line, with the line forming a boundary between an inner portion of the cooking area shielded from the radiant energy and an outer portion of the cooking area unshielded from the radiant energy.

Preferably, the arc has a central angle which is about 180 degrees measured about the axis of the sheath.

Preferably, the shield is at least partly reflective to reflect a portion of the radiant energy towards the outer portion of the cooking area.

Preferably, the body includes:

a base providing the floor; and a cover providing the ceiling, the cover moveable relative to the base between an open position and a closed position, wherein, in the closed position, the floor and ceiling at least partly surround the cooking cavity, and wherein, in the open position, the product can be moved in and out of the cooking appliance.

Preferably, the heating element is coupled to the cover and extends generally circumferentially around the ceiling.

Preferably, the cover is hingedly connected to the base for angular movement about a generally horizontal axis between the open position and the closed position.

Preferably, the cooking appliance includes a lower heating element located adjacent the floor to deliver radiant energy to cook the product.

Preferably, the product is pizza.

There is also disclosed herein a cooking appliance including:

a body providing a floor and a ceiling, with the floor and ceiling at least partly surrounding a cooking cavity, the body having an opening via which product to be cooked can be moved in and out of the cooking appliance;

a deck depending from the floor into the cavity, the cavity having a periphery at least partly surrounding a cooking area adjacent the deck to locate the product therein; and at least one heating element located in a lower portion of the cavity to deliver radiant energy to cook the product, with the ceiling having a periphery which is at least partly reflective to deflect a portion of the radiant energy toward a portion of the cooking area.

Preferably, the periphery of the ceiling is domed to deflect the portion of the radiant energy away from an inner portion of the cooking area and toward an outer portion of the cooking area.

Preferably, the cooking appliance includes an outer heating element and an inner heating element, the heating elements being located in a lower portion of the cavity, with the outer heating element being positioned opposite the periphery of the ceiling.

Preferably, the cooking appliance includes a controller operatively associated with the outer and inner heating elements to provide for selective delivery of electric power thereto, wherein the outer and inner heating elements are independently controllable by the controller.

Preferably, the cooking appliance includes a temperature sensor located within the cavity to provide a signal indicative of the temperature within the cavity to the controller to adjust the delivery of electric power to the outer and inner heating elements.

Preferably, the body includes:

a base providing the floor; and a cover providing the ceiling, the cover moveable relative to the base between an open position and a closed position, wherein, in the closed position, the floor and ceiling at least partly surround the cooking cavity, and wherein, in the open position, the product can be moved in and out of the cooking appliance.

Preferably, the cover is hingedly connected to the base for angular movement about a generally horizontal axis between the open position and the closed position.

Preferably, the product is pizza.

There is also disclosed herein a cooking appliance including:

a body providing a floor, a ceiling and an intermediate wall locating between the floor and ceiling, with the floor, ceiling, and wall at least partly surrounding a cooking cavity, the body having an opening via which product to be cooked can be moved in and out of the cooking appliance, the cavity having a periphery at least partly surrounding a cooking area adjacent the floor to locate the product therein;

a primary heating element located in the cavity to deliver radiant energy to cook the product; and a door moveable between an open position and a closed position relative to the opening of the cavity, the door having a secondary heating element positioned relative to the opening when the door is in the closed position to deliver radiant energy to a portion of the cooking area adjacent the opening.

Preferably, the door is hingedly connected to the base for angular movement about a generally horizontal axis between the open position and the closed position.

Preferably, the product is pizza.

BRIEF DESCRIPTION OF DRAWINGS

Preferred forms of the present disclosure will now be described, by way of examples only, with reference to the accompanying description and drawings in which.

DESCRIPTION OF EMBODIMENTS

Figure 1:
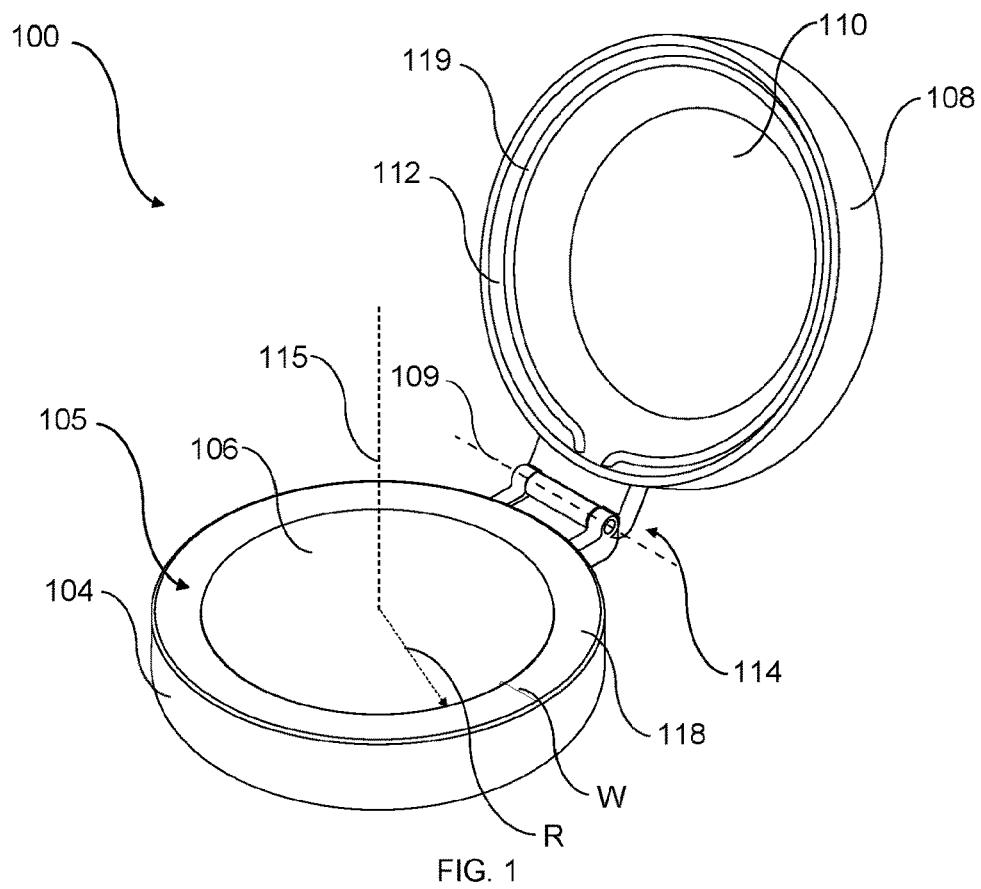
FIG. 1 is a perspective view of a cooking appliance according to a first embodiment shown in an open configuration.
Figure 2:
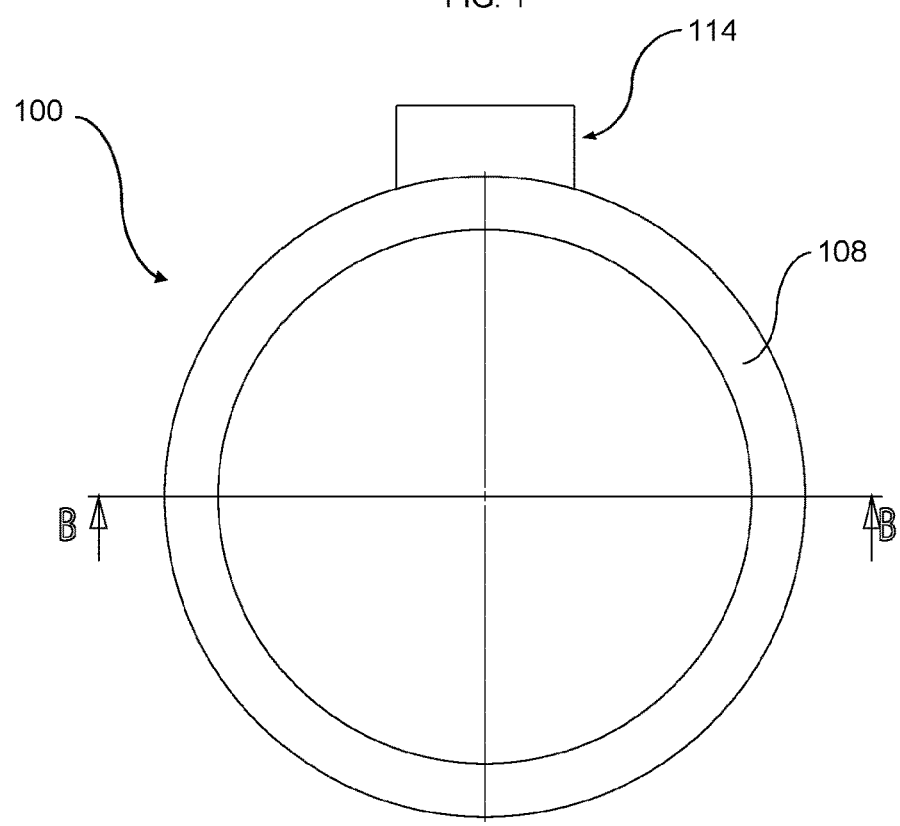
FIG. 2 is a top view of the cooking appliance of FIG. 1.

Referring firstly to FIGS. 1 to 7 of the drawings, a cooking appliance 100 according to a first embodiment is illustrated. The cooking appliance 100 is configured to cook a pizza 102 (shown in FIG. 5) during a cooking cycle of the cooking appliance 100. The pizza 102 has a circumference or outer portion 120 where the crust develops and a non-circumferential area or inner portion 122 where the toppings are spread over the pizza 102.

The cooking appliance 100 includes a generally circular body including a base 104 providing a floor 105 including a generally circular floor portion 106 for receiving the pizza 102 to be cooked, and a cover 108 providing a ceiling 110. The ceiling 110 is generally domed to form an intermediate wall 112 locating between the floor 105 and an upper surface of the ceiling 110. Although, it will be appreciated that an intermediate wall may extend from the base 104 to locate between the base 104 and the ceiling 110. The cover 108 is hingedly connected to the base 104 via hinge 114 for angular movement about a generally horizontal axis 109 between a closed position, in which the floor 105, ceiling 110 and wall 112 surround a cooking cavity 116 (shown in FIG. 5), and an open position in which the pizza 102 can be moved in and out of the cooking appliance 100.

Figure 5:
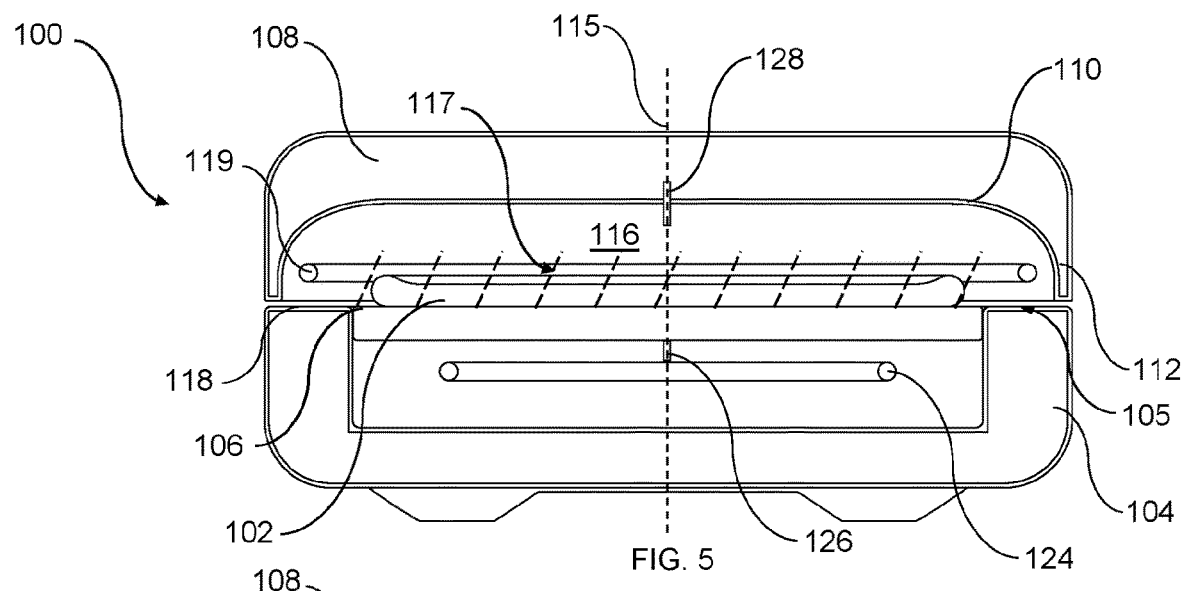
FIG. 5 is a schematic cross-sectional view of the cooking appliance of FIG. 1 taken along line B-B of FIG. 2.

The cavity 116 has a periphery which surrounds a cooking area 117 adjacent the floor portion 106 to locate the pizza 102 therein, as shown in FIG. 5.

A central axis 115 of the floor portion 106 extends perpendicularly between the floor 105 and the ceiling 110 when the cover 108 is in the closed position. The floor portion 106 extends generally horizontally radially outwardly from the axis 115 to a periphery of the floor portion 106 having a radius R measured from the axis 115, as shown in FIG. 1. The magnitude of the radius R is preferably determined to meet certain design criteria, such as the desired size of the cooked pizza. The floor 105 includes an annular region 118 spaced from the axis 115 and located between the periphery of the cavity 116 and the periphery of the floor portion 106. The region 118 has a width W which extends radially outwardly relative to the axis 115 around the periphery of the floor portion 106. The magnitude of the width W is preferably determined so that the region 118 does not extend past the wall 112.

Figure 3:
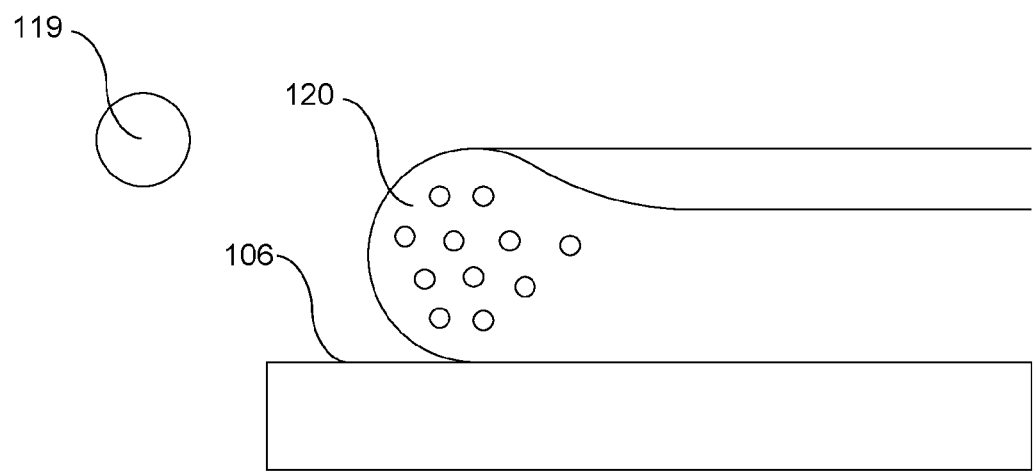
FIG. 3 is a schematic enlarged cross-sectional view of the cooking appliance of FIG. 1 showing the positional relationship between a heating element and a pizza of the cooking appliance.
Figure 4:
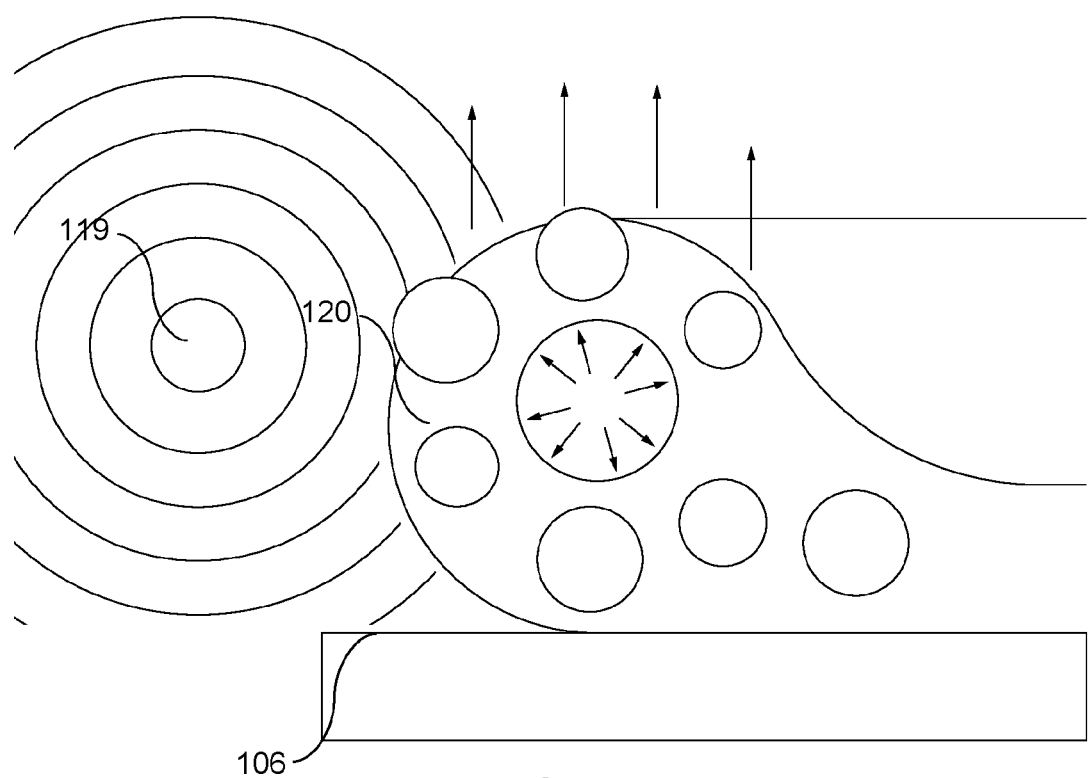
FIG. 4 is a schematic enlarged cross-sectional view of the cooking appliance of FIG. 1 showing the positional relationship between the heating element and the pizza when the heating element is energised.

An electrical heating element 119 is coupled to the cover 108 and extends generally circumferentially around the wall 112 of the cover 108 so that, in the closed position, the heating element 119 is positioned adjacent to and within the width W of the region 118 between the cooking area 117 and the periphery of the cavity 116. In this way, the heating element 119 is configured to be positioned in a lower portion of the cavity 116 and around the outer portion 120 of the pizza 102 located in the cooking area 117, as shown in FIGS. 3 and 5. The heating element 119 delivers radiant energy (i.e. heat) to cook the pizza 102.

Figure 6:
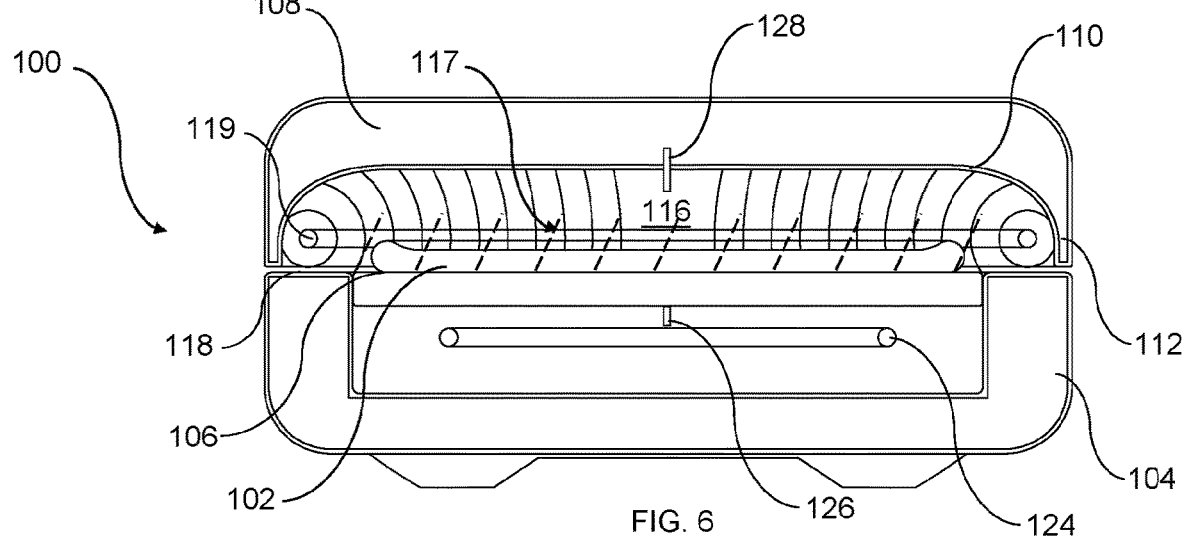
FIG. 6 is a schematic cross-sectional view of the cooking appliance of FIG. 1 taken along line B-B of FIG. 2 shown with the heating element energized at an initial stage of a cooking cycle.

At the start of the cooking cycle, the heat from the heating element 119 is initially absorbed by both the outer portion 120 and the inner portion 122 of the pizza 102, as shown in FIG. 6.

Figure 7:
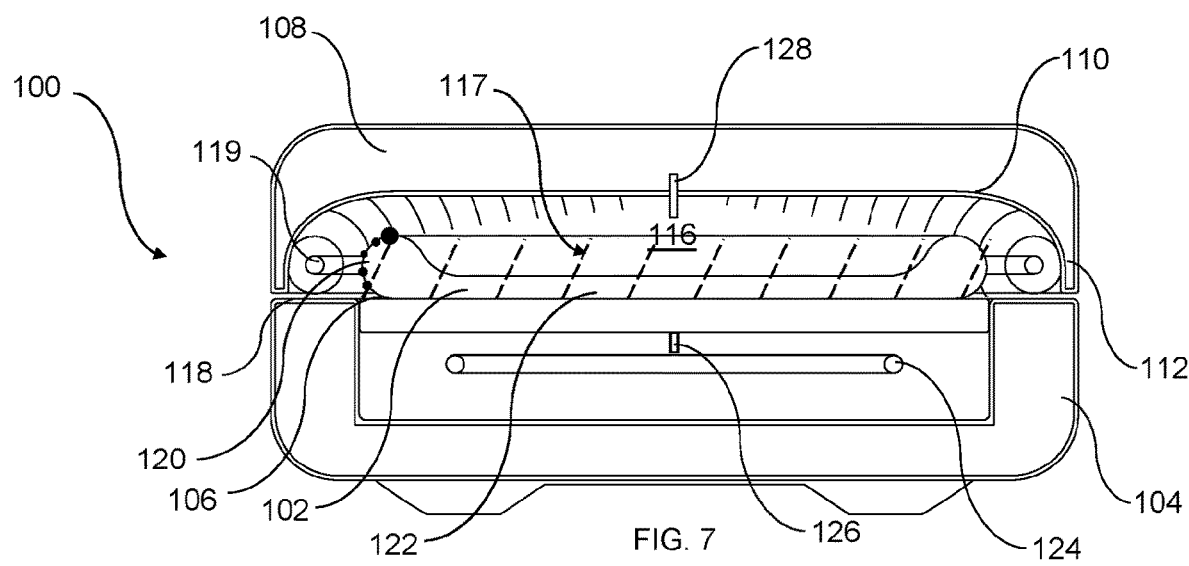
FIG. 7 is a schematic cross-sectional view of the cooking appliance of FIG. 1 taken along line B-B of FIG. 2 shown with the heating element energized at a later stage in the cooking cycle.
Figure 8:
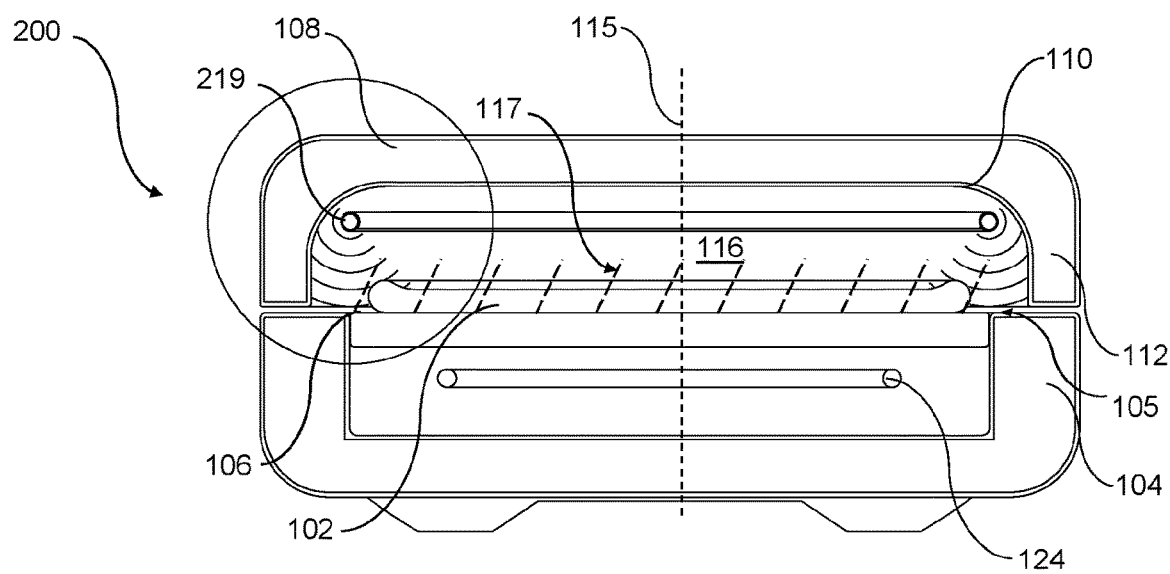
FIG. 8 is a schematic enlarged cross-sectional view of a cooking appliance according to a second embodiment.

At a later stage in the cooking cycle, however, the outer portion 120 of the pizza 102 will start to 'crust' and rise due to the action of raising agents (depicted as a cluster of bubbles in FIG. 4) in the pizza dough. As shown in FIG. 7, the outer portion 120 begins to rise in the cooking area 117 to a point where the outer portion 120 blocks or shields a portion of the heat from the inner portion 122 by virtue of the positioning of the heating element 119 around the cooking area 117 adjacent to the region 118.

This advantageously allows the crust which is forming at the outer portion 120 to be directly exposed to the heat whilst generally self-shielding the inner portion 122 of the pizza 102 from intense heat. This desirably results in a pizza crust being crisp whilst minimising charring of the toppings on the pizza when the cooking cycle is complete.

A lower heating element 124 extends circumferentially below the floor 106 to deliver radiant energy (i.e. heat) to the floor portion 106 of the base 104 to cook the inner portion 122 of the pizza 102.

Operation of the heating elements 119, 124 is controlled by a processor module (not shown) that receives a temperature signal from temperature sensor elements 126, 128 located in the ceiling 110 and adjacent the floor portion 106, respectively. The temperature sensor elements 126, 128 provide feedback to the processor module in order to cause the power which is applied to the heating elements 119, 124 to be controlled and eventually decreased/increased upon the desired temperature being reached.

FIGS. 8 to 11 show a cooking appliance 200 according to a second embodiment. The cooking appliance 200 is similar to that of the cooking appliance 100, but the heating element 119 is replaced with an upper heating element 219. Accordingly, features of the cooking appliance 200 that are identical to those of the cooking appliance 100 are provided with an identical reference numeral. For features that are identical between the cooking appliance 100 and the cooking appliance 200, it will be appreciated that the above description of those features in relation to the cooking appliance 100 is also applicable to the corresponding identical features found in the cooking appliance 200.

Figure 10:
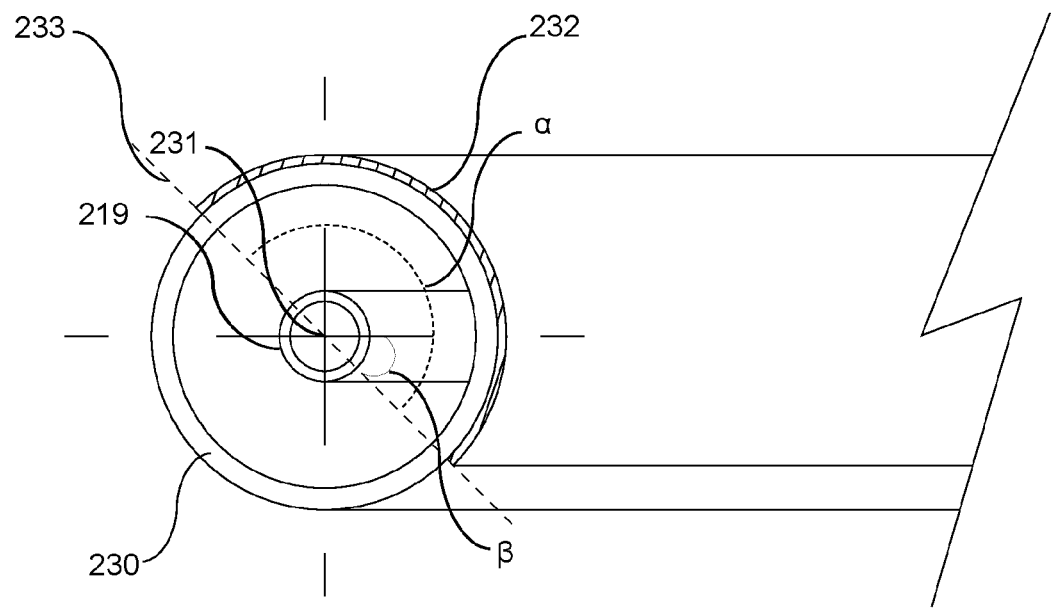
FIG. 10 is a further enlarged detail view of the upper heating element of FIG. 9.
Figure 11:
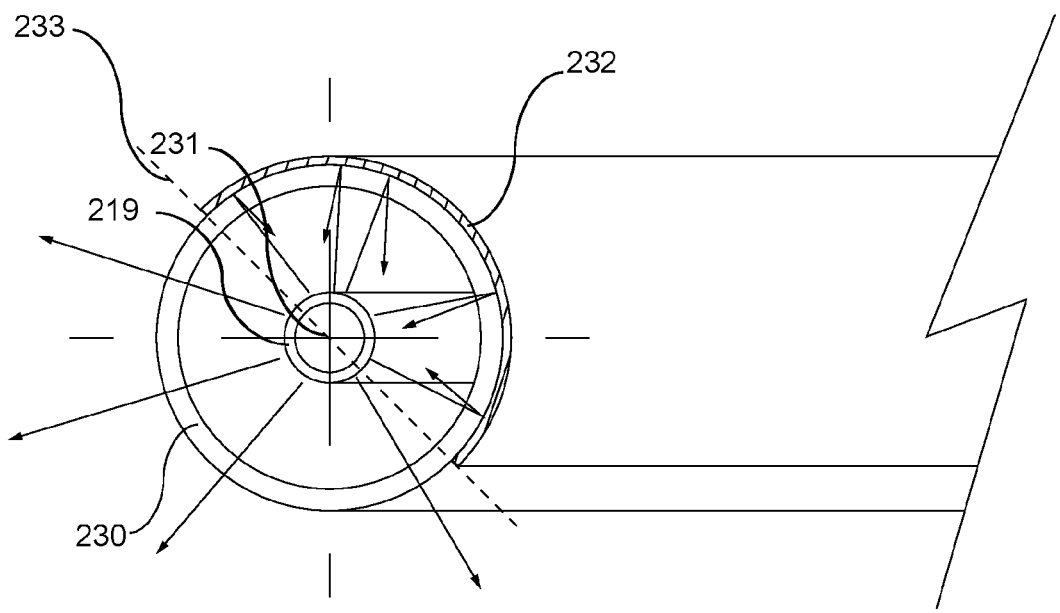
FIG. 11 is a further enlarged detail view of the upper heating element of FIG. 9 shown energised.
Figure 12:
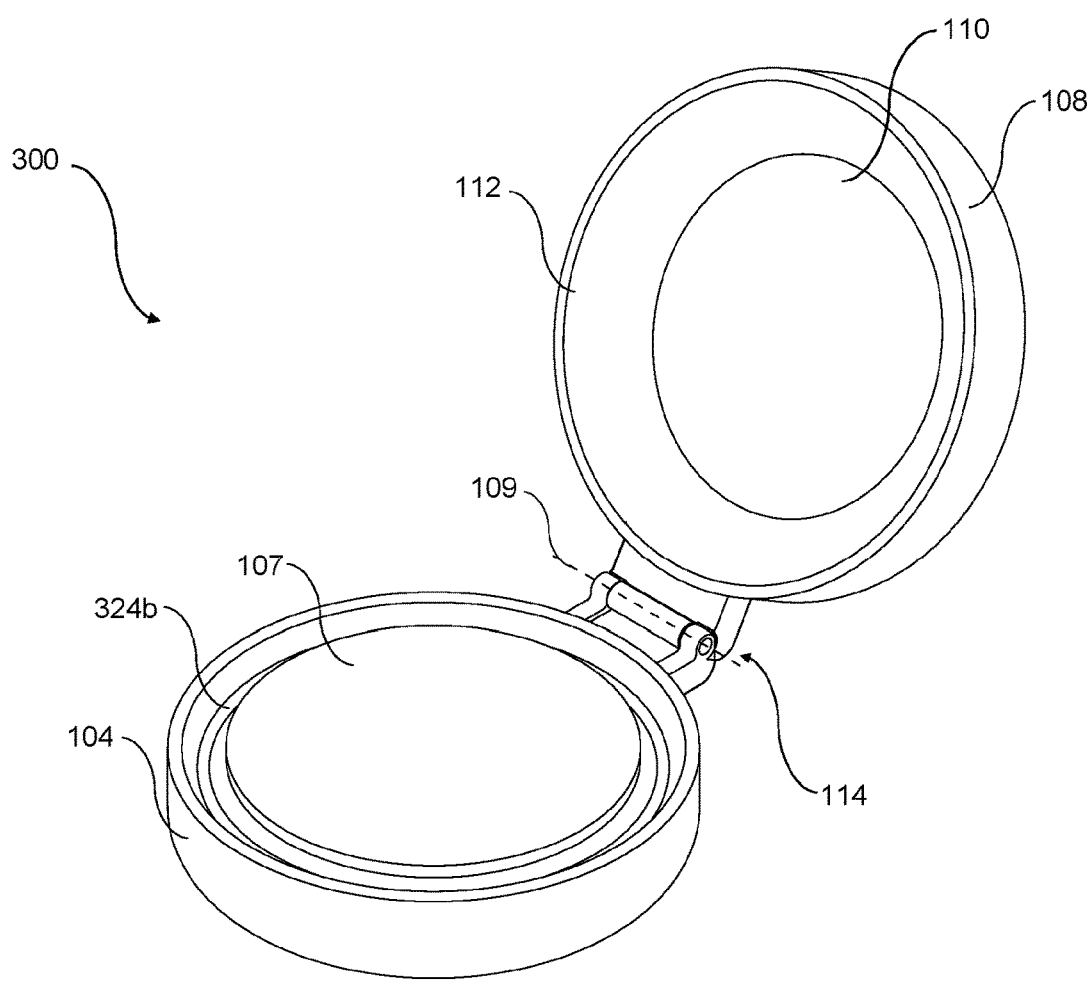
FIG. 12 is a perspective view of a cooking appliance according to a third embodiment shown in an open configuration.

The upper heating element 219 circumferentially extends around the ceiling 110 in an upper portion of the cavity 116 to deliver radiant energy (i.e. heat) to cook the pizza 102. As best depicted in FIGS. 10 and 11, the upper heating element 219 has a tubular glass sheath 230 surrounding the upper heating element 219. The sheath 230 has a central longitudinal axis 231.

As best depicted in FIG. 10, a reflective shield 232 is integrated with the upper heating element 219. The shield 232 partly surrounds an outer surface of the sheath 230, such that, in a cross-sectional plane extending perpendicular to the axis 231 through the sheath 230 and the shield 232, the shield 232 forms an arc having a radius that matches a radius of the outer surface of the sheath 230.

Figure 9:
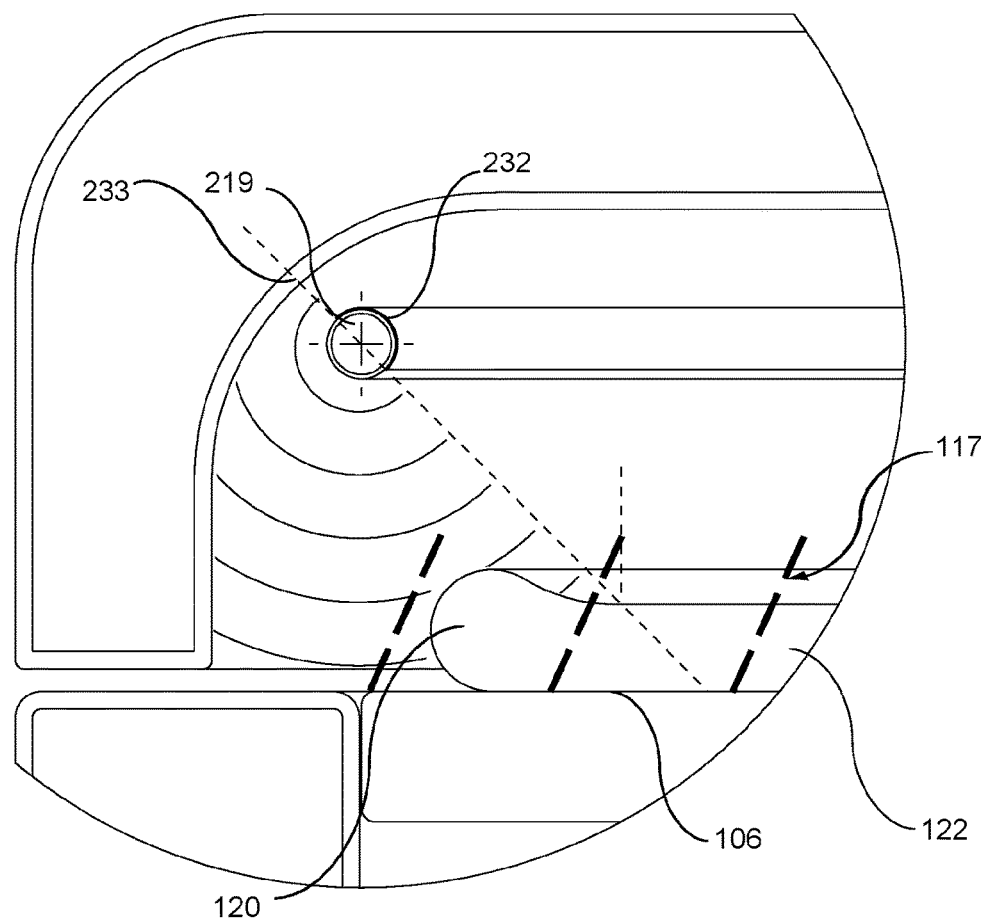
FIG. 9 is an enlarged detail view of an upper heating element of FIG. 8.

The arc has a central angle α which is preferably about 180 degrees measured about the axis 231. The endpoints of the arc locate on a line 233. The line 233 forms an angle β with a horizontal relative to the axis 115 of the cavity. In this way, the line 233 forms a boundary between an inner portion of the cooking area 117 which is shielded from the radiant energy by the shield 232 and an outer portion of the cooking area 117 which is unshielded from the radiant energy, as shown in FIG. 9. It will be appreciated that both the angles α, β may be varied to meet particular design criteria.

This advantageously allows more heat to be applied to the outer portion 120 of the pizza 102 to char the crust, whilst minimising heat to the inner portion 122 of the pizza 102 to minimise undesirable charring of the toppings.

FIGS. 12 to 15 show a cooking appliance 300 according to a third embodiment. The cooking appliance 300 is similar to that of the cooking appliance 100, but does not include the heating element 119. Also, the lower heating element 124 is replaced with inner and outer lower heating elements 324a, 324b (shown in FIG. 13). Although, it will be appreciated that the inner and outer lower heating elements 324a, 324b could be formed form a single heating element, such as a butterfly-shaped element. Accordingly, features of the cooking appliance 300 that are identical to those of the cooking appliance 100 are provided with an identical reference numeral. For features that are identical between the cooking appliance 100 and the cooking appliance 300, it will be appreciated that the above description of those features in relation to the cooking appliance 100 is also applicable to the corresponding identical features found in the cooking appliance 300.

Figure 13:
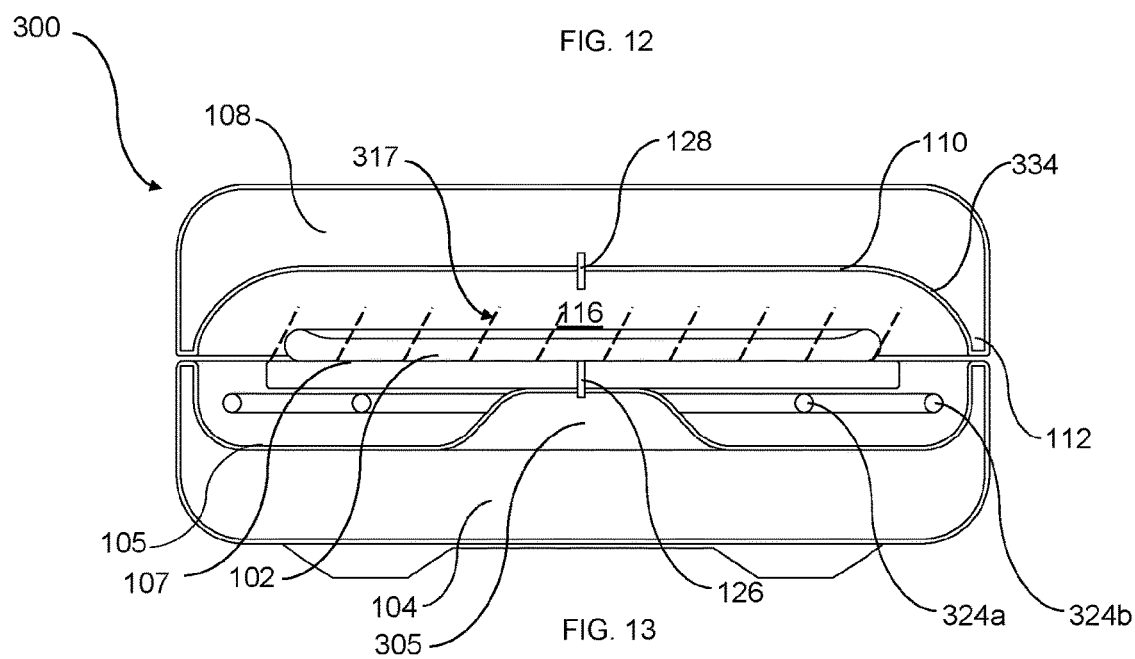
FIG. 13 is a schematic cross-sectional view of the cooking appliance of FIG. 12.
Figure 14:
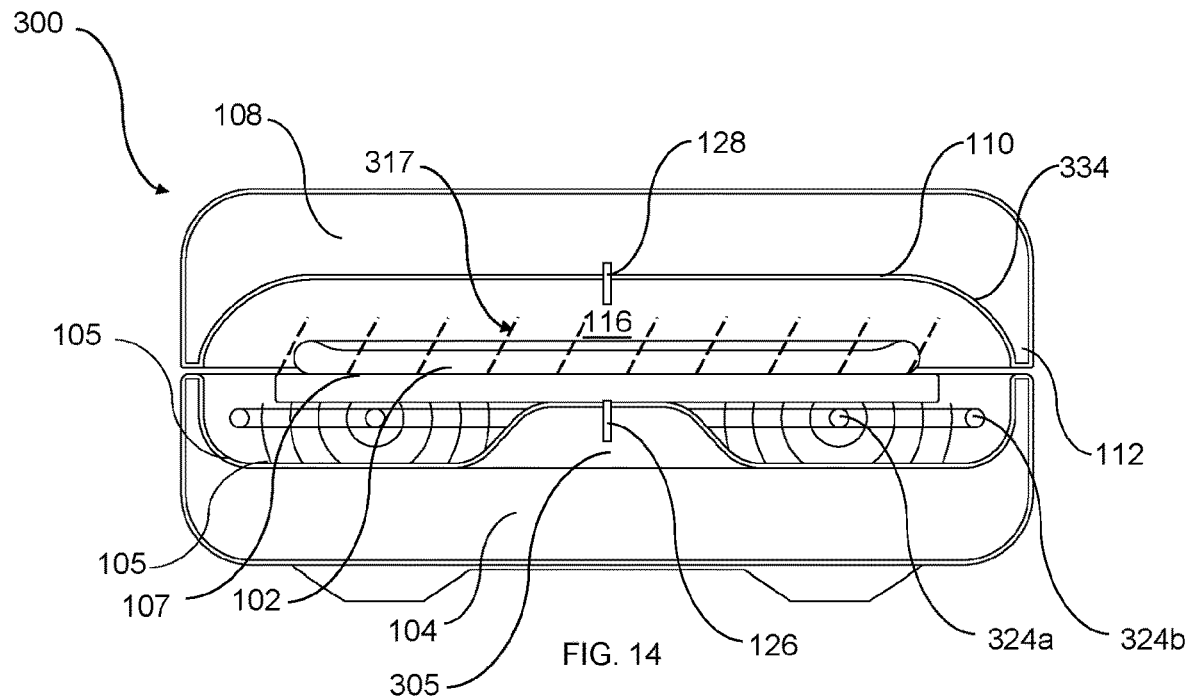
FIG. 14 is a schematic cross-sectional view of the cooking appliance of FIG. 12 showing an inner lower heating element energised.

A generally horizontally extending deck 107 for receiving the pizza 102 depends from a protrusion 305 of the floor 105 into the cavity 116 such that a gap is formed between a periphery of the deck 107 and the periphery of the cavity 116 as shown in FIG. 13. The cavity 116 has a periphery which surrounds a cooking area 317 adjacent the deck 107 to locate the pizza 102 therein, as shown in FIG. 13.

The inner and outer lower heating elements 324a, 324b extend circumferentially in a lower portion of the cavity 116 to deliver radiant energy (i.e. heat) to cook the pizza 102. The outer lower heating element 324b is concentrically arranged relative to the inner lower heating element 324a below the deck 107.

Figure 15:
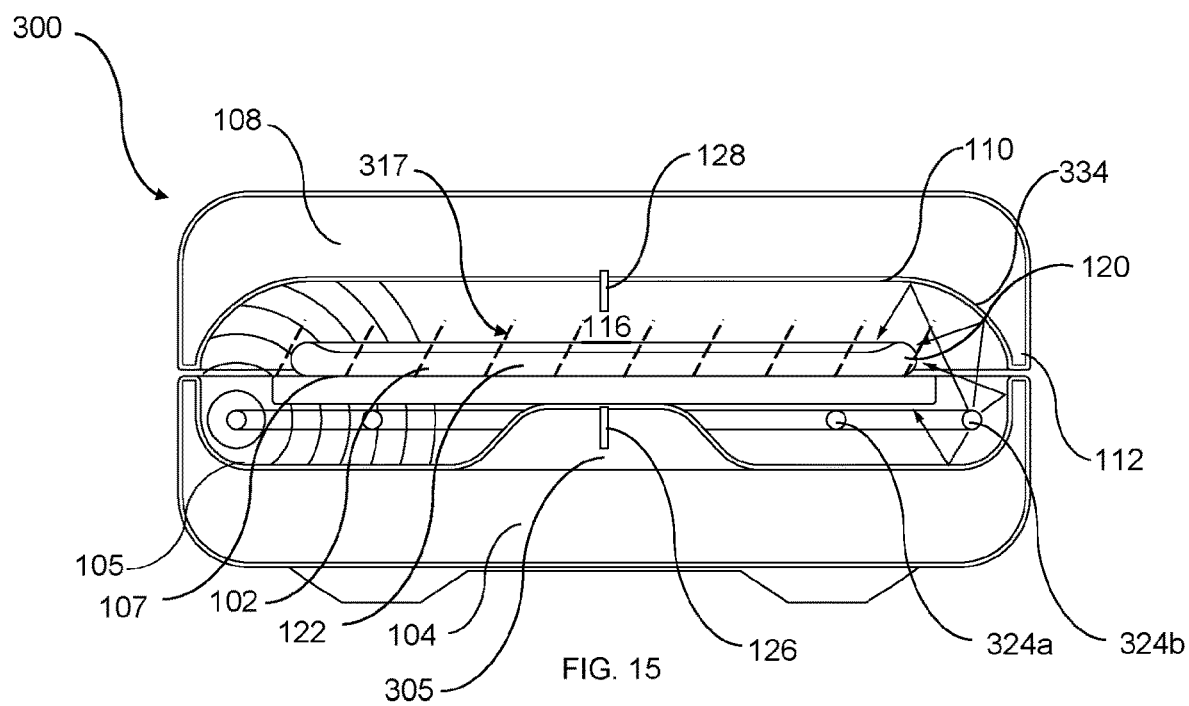
FIG. 15 is a schematic cross-sectional view of the cooking appliance of FIG. 12 showing an outer lower heating element energised.

The ceiling 110 has a domed portion at its periphery having a curved surface 334 made of a reflective material. The outer lower heating element 324b is positioned opposite the curved surface 334. The curvature of the surface 334 is designed so that a portion of the heat radiating from the outer lower heating element 324b through the gap to the surface 334 is deflected away from an inner portion of the cooking area 317 and instead focused toward an outer portion of the cooking area 317, as best depicted in FIG. 15.

The inner lower heating element 324a delivers heat to the deck 107 to cook the inner portion 122 of the pizza 102.

Operation of the heating elements 324a, 324b is controlled by a processor module (not shown) that receives a temperature signal from the temperature sensor elements 126, 128 located in the ceiling 110 and adjacent the floor 106, respectively. The temperature sensor elements 126, 128 provide feedback to the processor module in order to cause the power which is applied to the heating elements 324a, 324b to be controlled and eventually decreased/increased upon the desired temperature being reached.

In this way, the heat profile across the surface of the pizza 102 can be advantageously controlled to adjust heat to the outer portion 120 of the pizza 102 to char the crust, whilst independently adjusting heat to the inner portion 122 of the pizza 102 to minimise charring of the toppings whilst cooking the pizza 102.

FIGS. 16 to 20 show a cooking appliance 400 according to a fourth embodiment. The cooking appliance 400 is configured to cook a pizza 102.

The cooking appliance 400 includes a generally cuboidal body 402 providing a floor 404, a ceiling 406 and an intermediate wall 408 extending between the floor 404 and the ceiling 406. The floor 404, ceiling 406, and wall 408 at least partly surround a cooking cavity 410. The cavity 410 has a periphery which surrounds a cooking area 417 adjacent the floor 404 to locate the pizza 102 therein.

The body 402 has an opening 412 via which the pizza 102 that is to be cooked can be moved in and out of the cavity 410. The opening 412 is closed by a door 414 which is hinged to the body 402 at a lower portion of the door 414 for angular movement about a generally horizontal axis 415 between a closed position and an open position.

A primary heating element 420 extends circumferentially around the ceiling 406 in an upper portion of the cavity 410 to deliver radiant energy (i.e. heat) to cook the pizza 102.

A lower heating element 422 extends circumferentially below the floor 404 to deliver radiant energy (i.e. heat) to the floor 404 to cook the inner portion 122 of the pizza 102.

Figure 16:
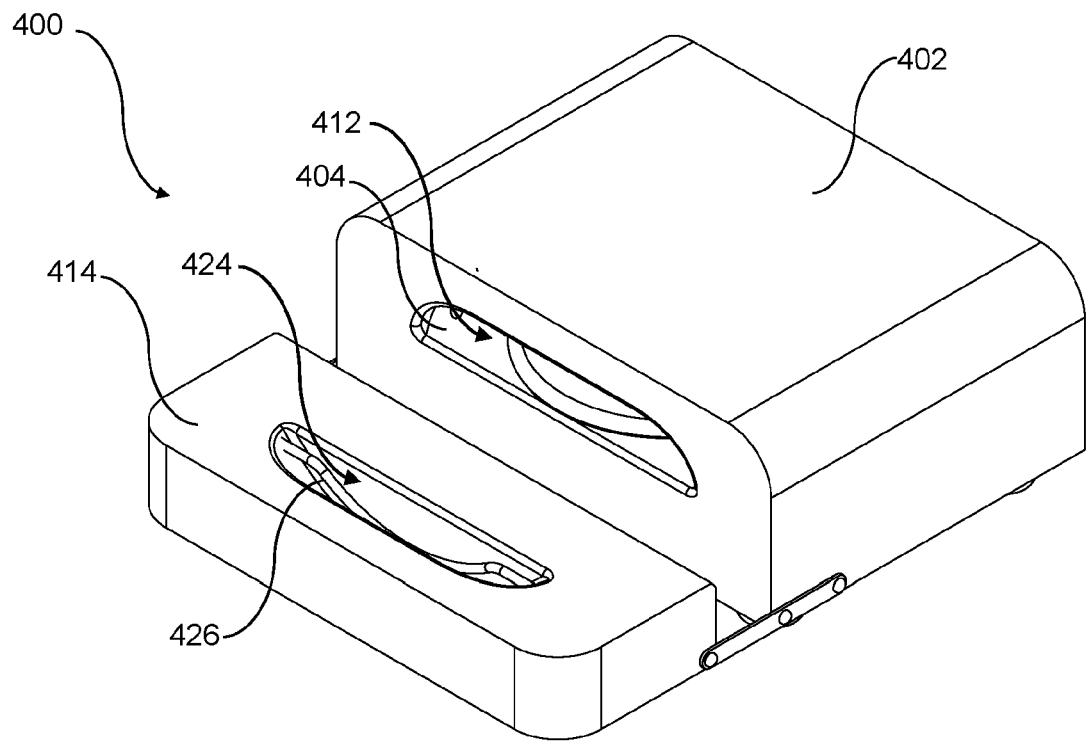
FIG. 16 is a perspective view of a cooking appliance according to a fourth embodiment shown with a door in an open position.
Figure 17:
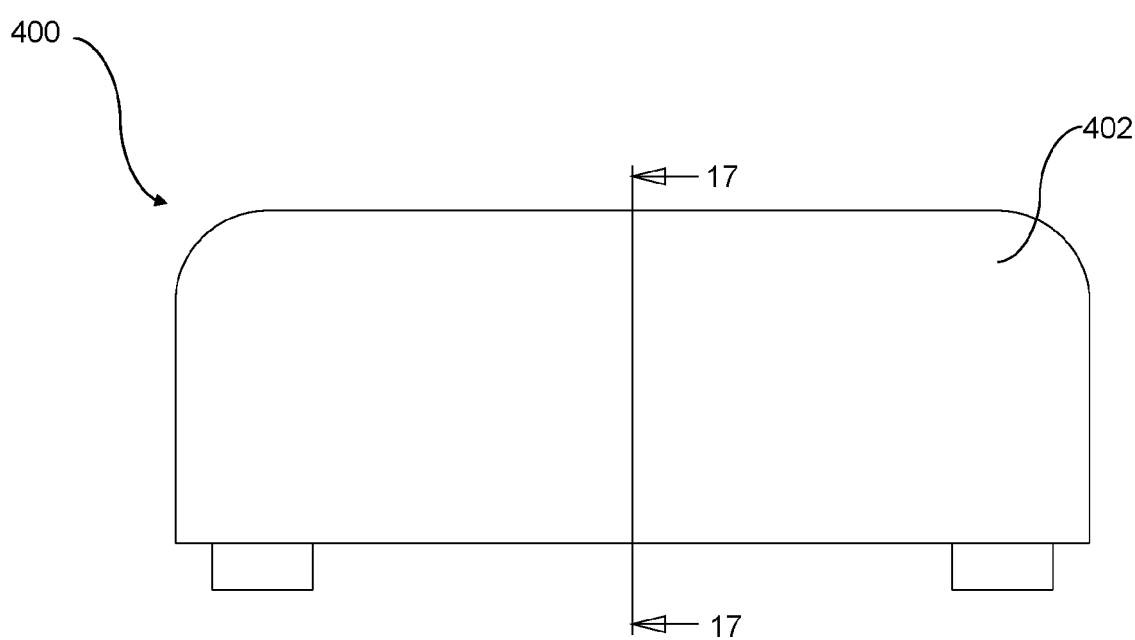
FIG. 17 is a rear view of the cooking appliance of FIG. 16.
Figure 19:
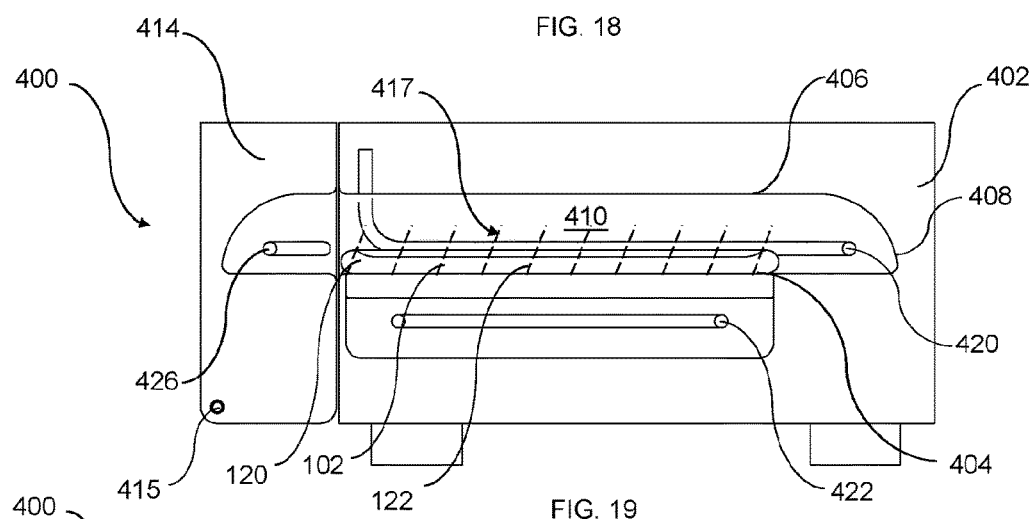
FIG. 19 is a schematic cross-sectional view of the cooking appliance of FIG. 16 taken along line 17-17 of FIG. 17, shown with the door in the closed position.
Figure 20:
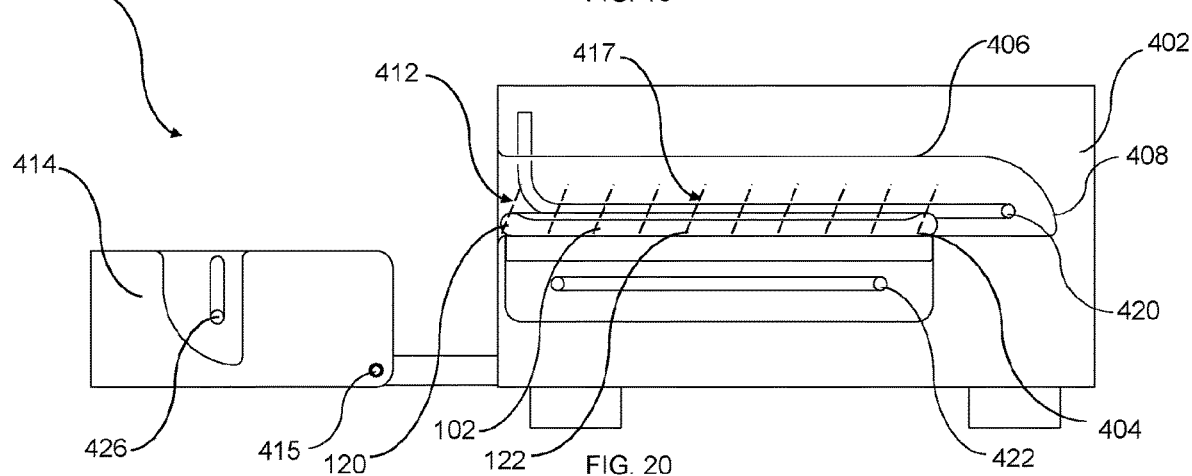
FIG. 20 is a schematic cross-sectional view of the cooking appliance of FIG. 16 taken along line 17-17 of FIG. 17, shown with the door in the open position.

As best depicted in FIG. 16, the door 414 includes a chamber 424 which houses a secondary heating element 426. The chamber 424 is shaped complementary to the cavity 410 to extend the cavity 410 to the door 414, as shown in FIG. 19.

Figure 18:
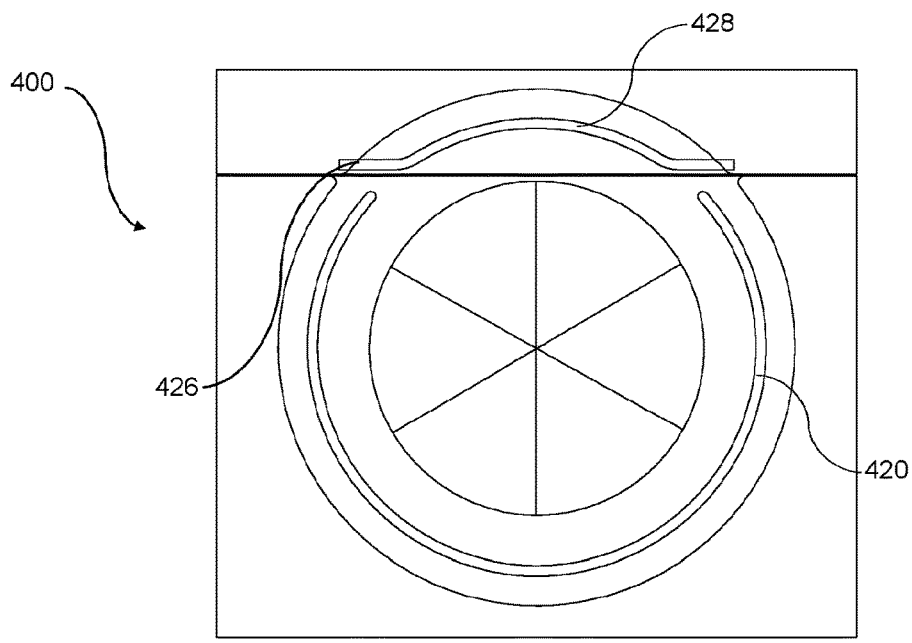
FIG. 18 is a schematic top view showing hidden detail of the cooking appliance of FIG. 16 shown with the door in a closed position.

The secondary heating element 426 has an arc portion 428 having a radius which is the same as a radius of the primary heating element 420, as best depicted in FIG. 18. When the door 414 closes the opening 412 of the cavity 410, the secondary heating element 426 is positioned adjacent to the opening 412 to deliver radiant energy (i.e. heat) to a portion of the cooking area 417 adjacent the opening 412.

This advantageously mitigates a temperature drop of the cavity 410 when the door 414 is opened thereby maintaining the temperature back to "cooking" temperature faster once the door 414 is closed.

The invention claimed is:

1. A cooking appliance including:
a body providing a horizontally extending floor including a floor portion, and a ceiling, with the floor and ceiling at least partly surrounding a cooking cavity, the body having an opening via which a pizza can be moved in and out of the cooking appliance, the floor portion having a central axis extending perpendicularly between the floor and the ceiling in the cavity, with the floor portion extending outwardly from the axis to a periphery of the floor portion, the cavity having a periphery at least partly surrounding a cooking area adjacent the floor portion, the pizza being received in the cooking area for cooking during a cooking cycle of the cooking appliance;
a heating element located in an upper portion of the cavity to deliver direct radiant energy to cook the pizza; and
a shield integral to the heating element and at least partly surrounding the heating element to shield a portion of the cooking area from the direct radiant energy,
wherein the heating element includes a tubular sheath having a central longitudinal axis, with the shield at least partly surrounding the tubular sheath,
wherein in a cross-sectional plane extending perpendicular to the axis through the sheath and the shield, the shield forms an arc having a radius that matches a radius of an outer surface of the sheath, and
wherein endpoints of the arc locate on a line, with the line forming a boundary between an inner portion of the cooking area shielded from the direct radiant energy and an outer portion of the cooking area unshielded from the direct radiant energy.

2. The appliance of claim 1, wherein the arc has a central angle which is about 180 degrees measured about the axis of the sheath.

3. The appliance of claim 1, wherein the shield is at least partly reflective to reflect a portion of the direct radiant energy towards the outer portion of the cooking area.

\* \* \* \* \*